US012577007B2

(12) United States Patent
Ogawa et al.

(10) Patent No.: US 12,577,007 B2
(45) Date of Patent: Mar. 17, 2026

(54) METHOD FOR PACKING VIALS, METHOD FOR INSTALLING VIALS, AND VIAL PACKED BODY AND METHOD FOR PRODUCING THE SAME

(71) Applicant: MITSUBISHI GAS CHEMICAL COMPANY, INC., Tokyo (JP)

(72) Inventors: Shun Ogawa, Kanagawa (JP); Shota Arakawa, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 18/710,254

(22) PCT Filed: Aug. 9, 2022

(86) PCT No.: PCT/JP2022/030376

§ 371 (c)(1),
(2) Date: May 15, 2024

(87) PCT Pub. No.: WO2023/095390

PCT Pub. Date: Jun. 1, 2023

(65) Prior Publication Data

US 2025/0091746 A1 Mar. 20, 2025

(30) Foreign Application Priority Data

Nov. 29, 2021 (JP) ................................ 2021-192862

(51) Int. Cl.
*B65B 31/04* (2006.01)
*A61J 1/18* (2023.01)
(Continued)

(52) U.S. Cl.
CPC ............... *B65B 31/048* (2013.01); *A61J 1/18* (2013.01); *B65B 5/068* (2013.01); *B65B 55/08* (2013.01); *B65B 69/0008* (2013.01)

(58) Field of Classification Search
CPC ....... B65B 31/048; B65B 31/04; B65B 5/065; B65B 5/067; B65B 69/0008; A61M 2207/00; A61M 5/002
See application file for complete search history.

(56) References Cited

U.S. PATENT DOCUMENTS 7,428,807 B2 * 9/2008 Vander Bush ..... B65D 77/0446 422/23
7,963,396 B2 * 6/2011 Vanderbush ......... B65D 81/203 206/524.8
(Continued)

FOREIGN PATENT DOCUMENTS

DE 10 2014 201 967 A1 8/2015
EP 3 490 892 B1 3/2020
(Continued)

OTHER PUBLICATIONS

International Search Report dated Oct. 25, 2022 in International Bureau of WIPO Patent Application No. PCT/JP2022/030376 with an English translation thereof.
(Continued)

*Primary Examiner* — Andrew M Tecco
(74) *Attorney, Agent, or Firm* — GREENBLUM & BERNSTEIN, P.L.C.

(57) ABSTRACT

To provide a method for transporting thermoplastic resin vials under sterile conditions and in an exogenous pyrogen-free state, introducing the vials into a filling assembly line, and thereafter allowing the vials to stand without tipping or dropping them, the method is a method for packing vials for filling with contents such as medicaments or cells by vacuum-packing the vials, and includes the following steps:
(I) inserting a plurality of vials in a tray with opening portion sides of the vials facing a bottom of the tray,
(II) installing a soft film on bottom portions of the vials,
(Continued)

(III) introducing the tray having the vials installed therein and the soft film into a gas-impermeable flexible film bag,
(IV) depressurizing the inside of the flexible film bag to a prescribed vacuum pressure, and
(V) sealing an opening of the flexible film bag.

6 Claims, 17 Drawing Sheets

(51) Int. Cl.

| | |
|---|---|
| ***B65B 5/06*** | (2006.01) |
| ***B65B 55/08*** | (2006.01) |
| ***B65B 69/00*** | (2006.01) |

(56) References Cited

U.S. PATENT DOCUMENTS

| | | | | |
|---|---|---|---|---|
| 8,360,238 | B2 * | 1/2013 | Nicoletti | B65D 25/101<br>206/443 |
| 8,813,963 | B2 * | 8/2014 | Nicoletti | B65D 25/108<br>206/562 |
| 11,884,436 | B2 * | 1/2024 | Zuffa | B65B 31/00 |
| 2006/0016156 | A1 * | 1/2006 | Bush | B65D 77/0446<br>53/469 |
| 2009/0288977 | A1 * | 11/2009 | Vanderbush | A61M 5/008<br>206/524.8 |
| 2019/0030236 | A1 * | 1/2019 | Okihara | A61M 5/008 |

FOREIGN PATENT DOCUMENTS

| | | | | |
|---|---|---|---|---|
| JP | 2006273400 | A | * | 10/2006 |
| JP | 5314892 | B2 | | 10/2013 |
| JP | 2014151935 | A | * | 8/2014 |
| WO | 2017/170636 | A1 | | 10/2017 |

OTHER PUBLICATIONS

Written Opinion dated Oct. 25, 2022 in International Bureau of WIPO Patent Application No. PCT/JP2022/030376 with an English translation thereof.

* cited by examiner

METHOD FOR PACKING VIALS, METHOD FOR INSTALLING VIALS, AND VIAL PACKED BODY AND METHOD FOR PRODUCING THE SAME

TECHNICAL FIELD

The present invention relates to a method for packing vials that are used for storage of medicaments or cells, or the like, a method for installing the vials, and a vial packed body and a method for producing the same.

BACKGROUND ART

Vials used for storage of medicaments or cells, or the like are sterilized in order to prevent contamination of the contents, and the level of exogenous pyrogens needs to be extremely low.

Glass vials generally widely used are transported from a forming machine under non-sterile conditions, and before they are introduced into a filling assembly line, they are subjected to sterilization and washing steps to make them be under sterile conditions and to lower the level of exogenous pyrogens.

By washing the glass vials and heating them to a prescribed temperature for a prescribed time, they are sterilized, and the level of exogenous pyrogens is lowered. Since the glass vials can be washed and placed in a heating furnace for a prescribed time, manufacturers who fill the vials with medicaments, cells, or the like mainly use the above method. On the other hand, thermoplastic resin vials cannot withstand temperatures required for lowering the level of exogenous pyrogens and for sterilization. In the case of the thermoplastic resin vials, it is possible to use a method including washing the thermoplastic resin vials and irradiating them with radiation to lower the level of exogenous pyrogens and to sterilize the vials. However, there is an upper limit on the heating temperature of the thermoplastic resin vials, and drying requires a long time, so that it is difficult to carry out washing on the filling assembly line. Therefore, it is preferable to sterilize the thermoplastic resin vials and to transport and introduce the vials into the filling assembly line in an exogenous pyrogen-free state. By transporting vials, which have been sterilized and extremely lowered in the level of exogenous pyrogens, to the filling assembly line, it becomes possible to skip the steps of sterilization and reduction of exogenous pyrogens. In addition, the thermoplastic resin vials generally have an extremely small number of adhesive bacteria immediately after the forming step, and the level of exogenous pyrogens is low, so that it is desirable to transport the vials in this state without impairing bactericidal properties and the low level of exogenous pyrogens. From such viewpoints, a method for transporting and introducing thermoplastic resin vials into the filling assembly line under sterile conditions and in an exogenous pyrogen-free state has been conventionally proposed (see, for example, Patent Literature 1).

CITATION LIST

Patent Literature

Patent Literature 1
Japanese Patent No. 5314892

SUMMARY OF INVENTION

Technical Problem

However, the method including "placing a rigid sheet, vials, and a tray on a supporting surface in such a state that bottom sides of the vials are put on the rigid sheet and removing the rigid sheet from the bottom sides so that the bottom sides of the vials are put on the supporting surface" described in Patent Literature 1 has a problem that the vials are pulled by the rigid sheet and thereby tipped over or dropped. The present invention has been made in view of the above problem, and it is an object of the present invention to provide a method for transporting thermoplastic resin vials under sterile conditions and in an exogenous pyrogen-free state, introducing the vials into a filling assembly line, and thereafter allowing the vials to stand without tipping or dropping them.

Solution to Problem

The present inventors have earnestly studied a method for packing vials, etc., and as a result, they have found that the above problem is solved by using specific methods as a method for taking out vials from an outer bag and a vertical inversion method, and they have accomplished the present invention.

That is to say, the present invention includes the following embodiments.

<1>

A method for packing vials by vacuum-packing vials for filling with contents such as medicaments or cells, the method comprising the following steps:

(I) inserting a plurality of vials in a tray with opening portion sides of the vials facing a bottom of the tray, (II) installing a soft film on bottom portions of the vials, (III) introducing the tray having the vials installed therein and the soft film installed on the bottom portions of the vials, into a gas-impermeable flexible film bag, (IV) depressurizing the inside of the flexible film bag to a prescribed vacuum pressure so that the flexible film bag surrounds at least the soft film and the tray and fixes them, and (V) sealing an opening of the flexible film bag so that the depressurized inside of the flexible film bag can be maintained at the prescribed vacuum pressure.

<2>

The method for packing vials according to the above <1>, further comprising the following steps:

(VI) forming and inspecting vials before the step (I), and (VII) carrying out sterilization by radiation after the step (V).

<3>

The method for packing vials according to the above <2>, wherein when the opening of the flexible film bag is sealed in the step (V), the opening is sealed together with part of the soft film.

<4>

The method for packing vials according to any one of the above <1> to <3>, wherein the prescribed vacuum pressure in the step (IV) is in the range of 20 to 40 kPa.

<5>

The method for packing vials according to any one of the above <1> to <4>, wherein the soft film described in the step (III) has a shape to cover all of peripheral portions of the tray.

<6>

A method for installing vials by transporting a packed body of vials packed by the method according to any one of the above <1> to <5> and installing the vials after opening of the packed body, the method for installing vials comprising the following steps:

(VIII) transporting the soft film, the tray, and the vials having been vacuum-packed with the flexible film bag by depressurizing and sealing the flexible film bag, to a contents-filling location, (IX) tearing the flexible film bag, at the contents-filling location, by using a tear notch formed at one end of the bag as a starting point to release the vacuum state of the inside of the flexible film bag, (X) taking out the tray and the vials from the flexible film bag, (XI) inverting the vials and the tray with an inversion device comprising a tool for fixing the tray and a tool having a supporting surface for supporting the bottom portions of the vials, (XII) removing the tray from the vials vertically, and (XIII) installing the vials at prescribed positions.

<7>

A method for producing a vial packed body by vacuum-packing vials for filling with contents such as medicaments or cells to make the vials suitable for transport to a prescribed filling location, the method comprising:

inserting a plurality of vials in a tray with opening portion sides of the vials facing a bottom of the tray, installing a soft film on bottom portions of the vials, introducing the tray having the vials installed therein and the soft film installed on the bottom portions of the vials, into a gas-impermeable flexible film bag, depressurizing the inside of the flexible film bag to a prescribed vacuum pressure so that the flexible film bag surrounds at least the soft film and the tray and fixes them, and sealing an opening of the flexible film bag so that the depressurized inside of the flexible film bag is maintained at the prescribed vacuum pressure.

<8>

A vial packed body obtained by vacuum-packing vials for filling with contents such as medicaments or cells to make the vials suitable for transport to a prescribed filling location, the vial packed body comprising:

a tray having a plurality of vials inserted therein with opening portion sides of the vials facing a bottom of the tray, a soft film installed on bottom portions of the vials, and a gas-impermeable flexible film bag into which the tray having vials installed therein and the soft film installed on the bottom portions of the vials are to be introduced, which is to be depressurized so that the flexible film bag surrounds at least the soft film and the tray and fixes them, and an opening of which is to be sealed.

Advantageous Effects of Invention

According to the present invention, a method for packing vials, which can transport thermoplastic resin vials under sterile conditions and in an exogenous pyrogen-free state, introduce the vials into a filling assembly line, and thereafter allow the vials to stand without tipping or dropping them, a method for installing vials, and a vial packed body and a method for producing the same can be provided.

BRIEF DESCRIPTION OF DRAWINGS

FIG. 4A is a view schematically showing a cross-section structure seen from the side, and FIG. 4B is a view schematically showing the same seen from above.

DESCRIPTION OF EMBODIMENTS

Figure 1:
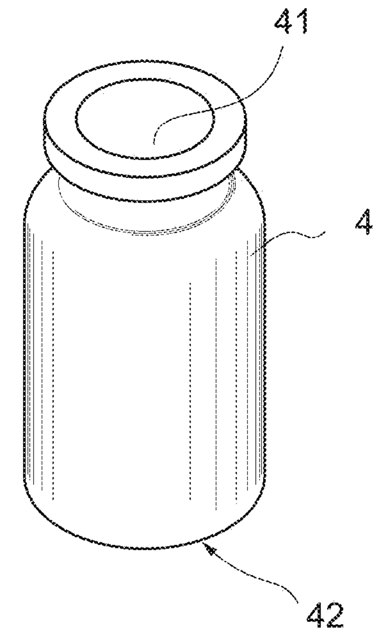
FIG. 1 is a perspective view showing one example of a vial.

Hereinafter, an embodiment of the present invention (referred to as the "present embodiment" hereinafter) will be described. The present embodiment is an example for describing the present invention, and is not intended to limit the present invention to the following contents.

The vial packed body (1) of the present embodiment includes a gas-impermeable flexible film bag (2), a tray (3), a plurality of vials (4), and a soft film (5).

<Flexible Film Bag>

Figure 6A:
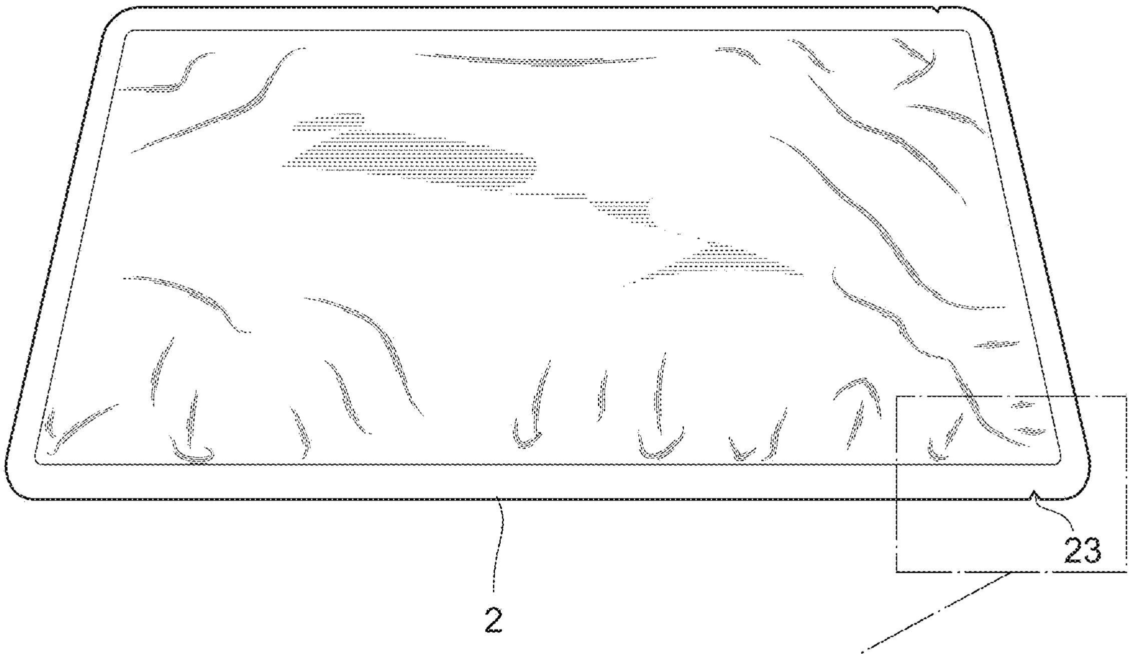
FIG. 6A is a view showing the whole of a flexible film bag.
Figure 6B:
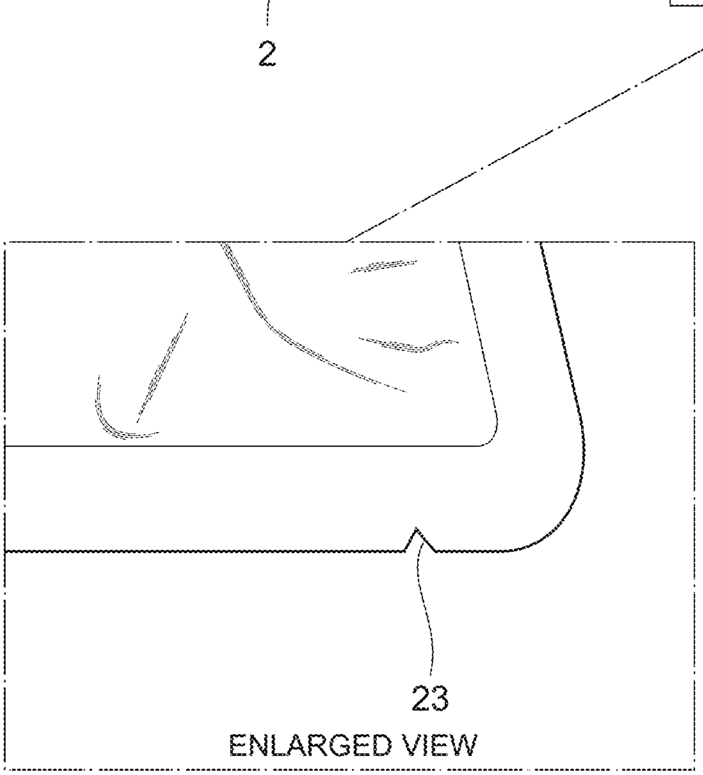
FIG. 6B is an enlarged view showing a tear notch provided at an opening of the flexible film bag.

The flexible film bag (2) of the present embodiment can be of any shape, material, or size as long as it is an air-impermeable and its opening (22) can be sealed after the tray (3) in which the vials (4) have been inserted and the soft film (5) installed on bottom portions (42) of the vials (4) are introduced into the flexible film bag and the inside (21) of the flexible film bag (2) is depressurized, but the flexible film bag is preferably transparent or translucent. By making the flexible film bag transparent or translucent, it becomes possible to visually recognize the vials (4) during packing and storing. From the viewpoints of transparency, gas-impermeability, impact strength, piercing strength, and pinhole resistance, a film obtained by laminating a deposited polyethylene terephthalate film, a stretched nylon film, and a polyethylene film can be preferably used as an example of the flexible film bag (2) (see FIG. 6A, etc.). In the vicinity of an end (opening (22) or portion on the opposite side thereof) of the flexible film bag (2), a tear notch (23) for easily tear-opening the flexible film bag is provided (see FIG. 6B).

<Tray>

Figure 2:
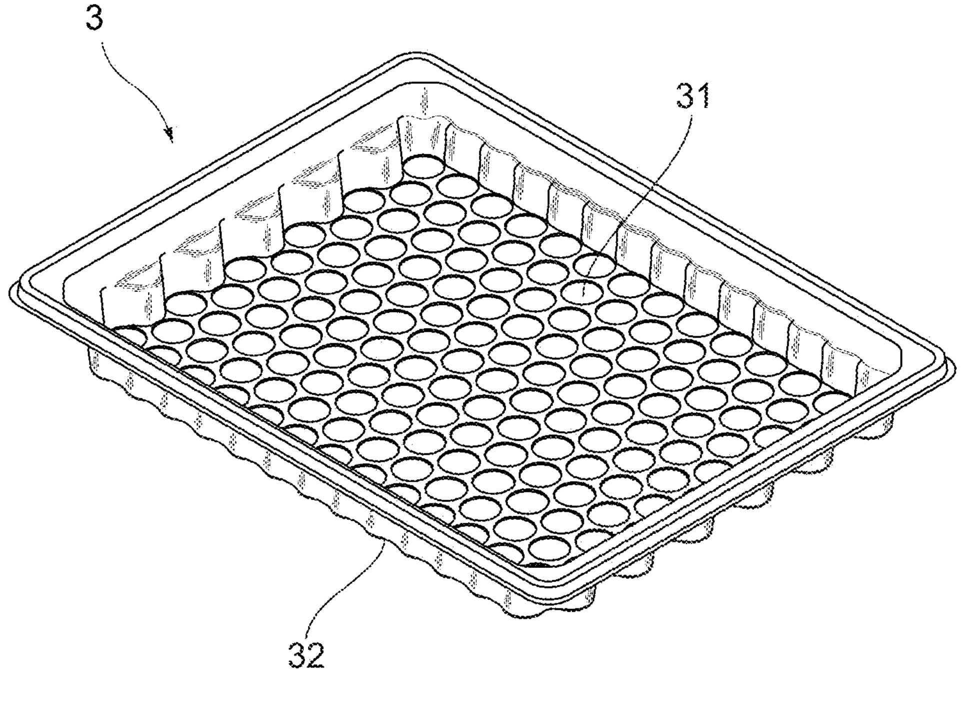
FIG. 2 is a perspective view showing one example of a tray.
Figure 3:
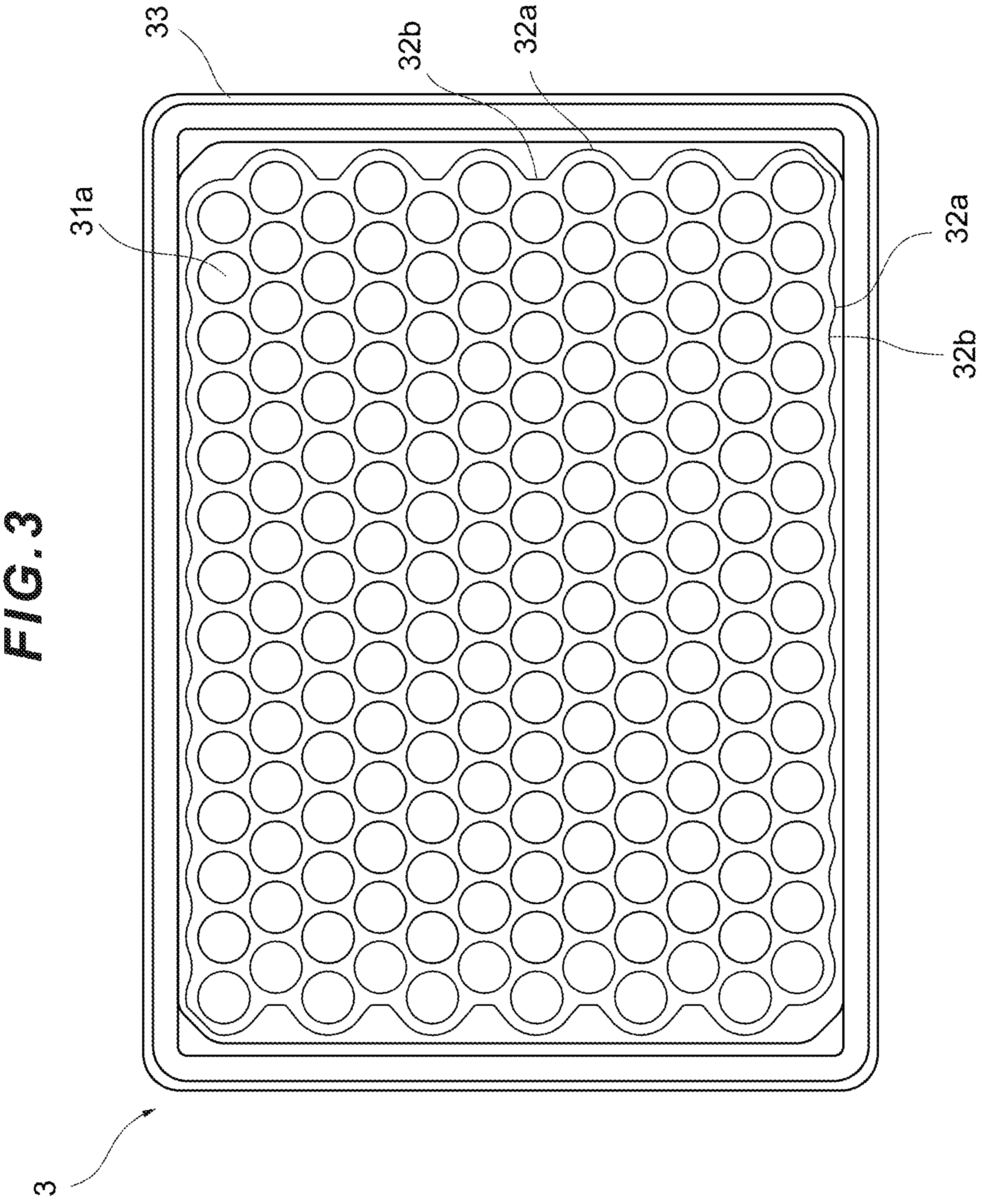
FIG. 3 is a view showing a tray seen from above.

The tray (3) of the present embodiment can be of any shape, material, production method, or size as long as the vials (4) can be inserted therein, but a tray (3) obtained by pressure forming a thermoplastic resin sheet can be preferably used (see FIG. 2, FIG. 3). For the tray (3), a material other than the thermoplastic resin may be used, or the tray may be formed by using a production method of injection molding, machining, or the like, but a tray (3) made by pressure forming a thermoplastic resin sheet is preferable because it is relatively easily obtainable and inexpensive. When radiation sterilization is carried out in one embodiment of the present invention, polystyrene, polyethylene, polyamide, and polyethylene terephthalate are preferable, and among these, polyethylene terephthalate that is transparent and excellent in impact resistance is most preferable.

Figure 5:
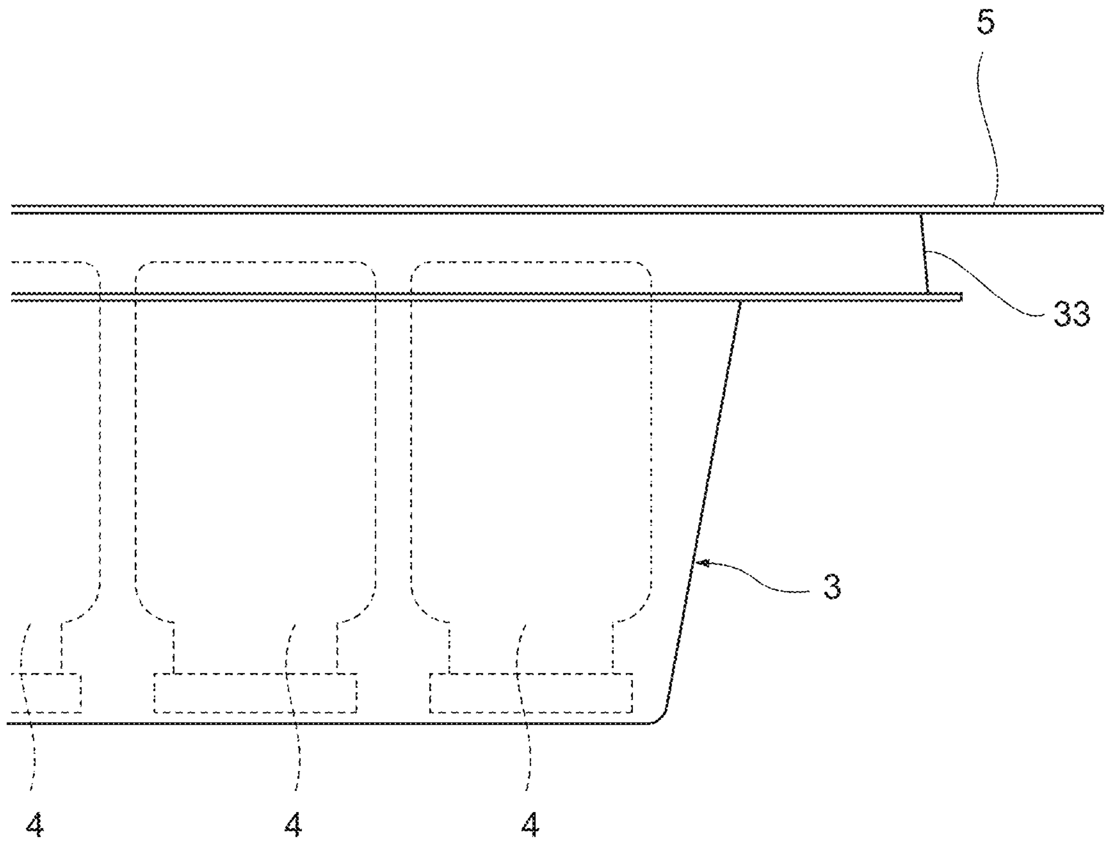
FIG. 5 is a view showing a soft film installed on a tray having vials inserted therein.

An example of the shape of the tray (3) is a shape constituted of an approximately quadrilateral bottom (31), a peripheral wall portion (32) whose lower end is continuous to all four sides of the bottom (31) and which extends upward, and two pairs of peripheral portions (33) which are continuous to an upper end of the peripheral wall portion (32), extend outward, and face each other (see FIG. 2, FIG. 3). The height of the peripheral wall portion (32) is not limited, but it is preferably substantially the same as the height of a vial (4) to be inserted in the tray (see FIG. 5, etc.). By making the height of the peripheral wall portion (32) and the height of the vial (4) substantially the same as each other, there is no difference in level between the peripheral portions (33) of the tray (3) and the bottom portions (42) of the vials (4) in such a state that the vials (4) have been inserted in the tray (3), and when the inside (21) of the flexible film bag (2) is depressurized, load applied to the flexible film is reduced to make it possible to prevent bag breakage or formation of pinhole.

The peripheral wall portion (32) of the tray (3) is preferably in an arc shape (32*a*) that is continuous in waves so as to follow an arc shape of the vial (4) when the vial (4) is arranged close to the peripheral wall portion (32) (see FIG. 3, etc.). When the vial is arranged at the position away from the peripheral wall portion (32), a convex portion (32*b*) is preferably provided between the arc shape (32*a*) and the arc shape (32*a*) so as to fill a gap (see FIG. 3, etc.). By providing the arc shape (32*a*) and the convex portion (32*b*), the vials (4) can be stably stored so that tipping of the vials (4), moving thereof in the tray (3), dropping-off thereof, and the like do not occur when the vials (4) are arranged in a state of closest packing.

Figure 4A:
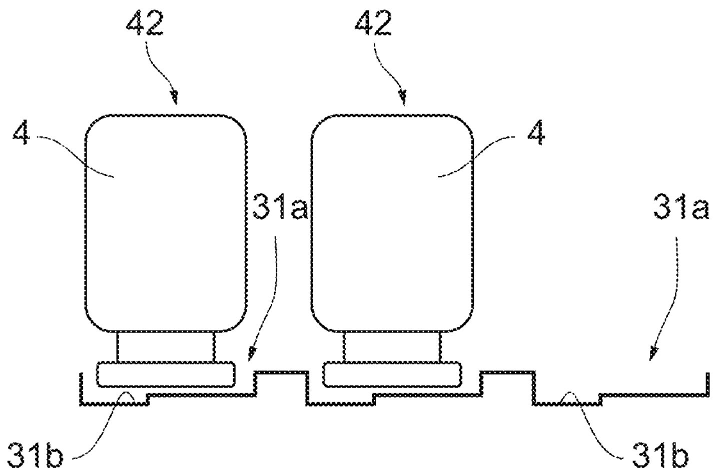
FIGS. 4A and 4B show configuration examples of grooves of a tray.
Figure 4B:
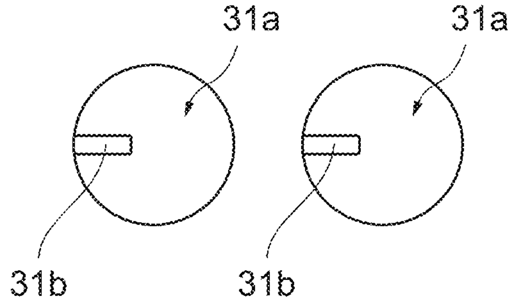

The bottom (31) of the tray (3) preferably has circular depressions (31*a*) each having a diameter slightly larger than a flange diameter of an opening portion (41) of each vial, at the positions by which the vials (4) are in a state of closest packing when the vials (4) are inserted in the tray (3) with the opening portions (41) of the vials (4) facing down (see FIG. 3, FIG. 4). By providing the depressions (31*a*), the vials can be stably stored so that moving of the vials (4) in the tray (3) does not occur when the vials (4) are arranged in a state of closest packing. Each of the circular depressions (31*a*) is preferably provided with at least one groove-like portion (31*b*) that connects the interior and the exterior of the vial (4) to each other when the vials (4) are inserted with their opening portions (41) facing down (see FIG. 4). By providing the groove-like portion (31*b*), even the interior of each vial (4) is depressurized when the inside (21) of the flexible film bag (2) is depressurized to a prescribed pressure, and hence, the vials (4) can be stored and transported without lowering the degree of depressurization by the pressure of air remaining in the interior of the vial (4).

<Vial>

The vial (4) of the present embodiment is formed of a thermoplastic resin, and has a shape similar to that of a conventional vial capable of being filled with solid medicaments, liquid medicaments, cells, or the like and storing them, and having a circular opening portion (41) and a bottom portion (42) (see FIG. 1). The thermoplastic resin for forming the vial (4) is not limited as long as it fulfills a function of a vial (4), but from the viewpoints of transparency, preservability of medicaments, etc., a cycloolefin-based polymer, such as a cycloolefin polymer or a cycloolefin copolymer, can be preferably used. The vial (4) may have a multilayer structure wherein a cycloolefin-based polymer/a gas barrier thermoplastic resin/a cycloolefin polymer are laminated in this order from the inner side of the container, for the purpose of imparting gas barrier properties to the vial (4).

<Soft Film>

The soft film (5) of the present embodiment is made of a thermoplastic resin, and there is no problem with any thermoplastic resin as long as it has flexibility to follow and change in shape when the gas-impermeable flexible film bag (2) is deformed so as to fix the soft film (5) and the tray (3) by depressurizing the inside (21) of the gas-impermeable flexible film bag (2) to a prescribed vacuum pressure, but the soft film is preferably transparent or translucent. By making the soft film transparent or translucent, the vials can be visually recognized during packing and storing. When radiation sterilization is carried out in one embodiment of the present invention, preferred for the soft film (5) are polyethylenes, and among the polyethylenes, low-density polyethylene and linear low-density polyethylene each having transparency and high flexibility are preferred.

The soft film (5) is preferably sufficiently larger than the tray (3), for example, it is made to have a rectangular shape one size larger than the tray (3). When such a soft film (5) is installed on the tray (3) in which the vials (4) have been inserted, in such a manner that the soft film covers the bottom portions of the vials (4), the soft film protrudes outside from the peripheral portions (33) of the tray (3) in any place (see FIG. 5), and the soft film can constitute a vial packed body (1) while entirely covering an opening part of the tray (3).

Subsequently, a step of packing the vials (4) to produce a vial packed body (1), and further, a step of transporting the vial packed body (1) and installing the vials (4) (or allowing the vials (4) to stand) after opening the packed body will be described with preferred examples. In the present embodiment, steps (I) to (V) are successively carried out. Hereinafter, the contents of these steps will be described. The number (Roman numeral) to indicate the step order corresponds to the number in the invention disclosed in the column of the aforementioned "Solution to Problem".

<Step I>

The vials (4) are taken out from a vial production line including a vial forming machine and inspection equipment (not shown), and inserted one by one or several together in the tray (3) by transportation equipment (not shown) with the vial opening portions (41) facing the bottom (31) side of the tray (see FIG. 4A, etc.). When the vials are inserted, one or a plurality of vials (4) are preferably arranged by this transportation equipment so that the vials can enter the depressions (31*a*) of the tray (3). The reason for this is that if an alignment work for rearranging the vials by another alignment means (not shown) so that the opening portion (41) sides can enter the depressions (31*a*) is carried out after the vials are inserted in the tray (3), the vials (4) may be damaged by rubbing between the vials (4), or tipping of the vials (4) may occur. The inspection equipment preferably includes dimensional inspection equipment and visual inspection equipment. By carrying out the dimensional inspection, vials (4) of inappropriate sizes can be excluded, and by carrying out the visual inspection, vials (4) to which foreign matters have adhered or which have been contaminated with foreign matters can be excluded.

<Steps II to V>

Figure 7:
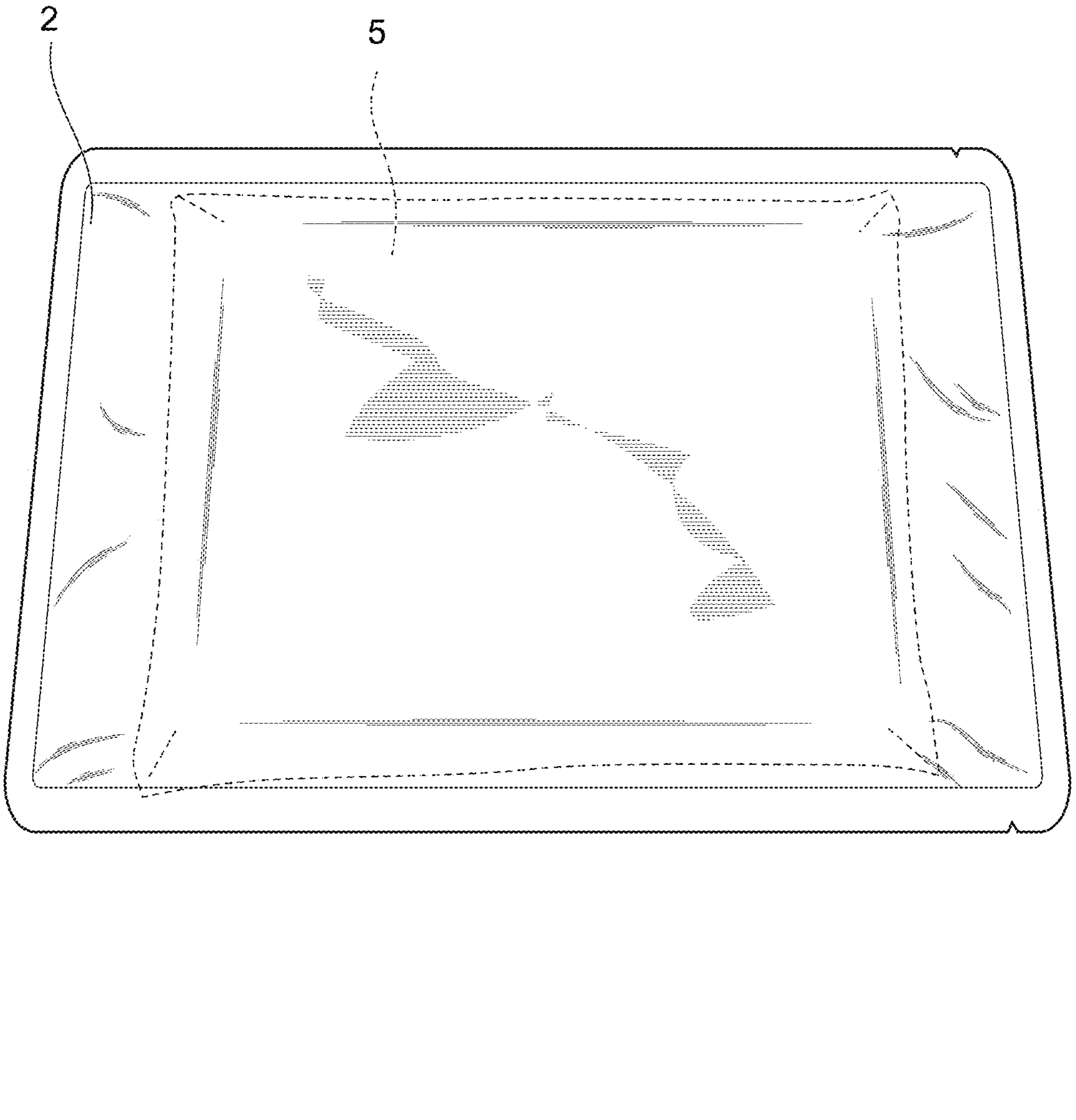
FIG. 7 is a view showing a tray with a soft film placed thereon, the tray having been introduced into a flexible film bag.
Figure 8:
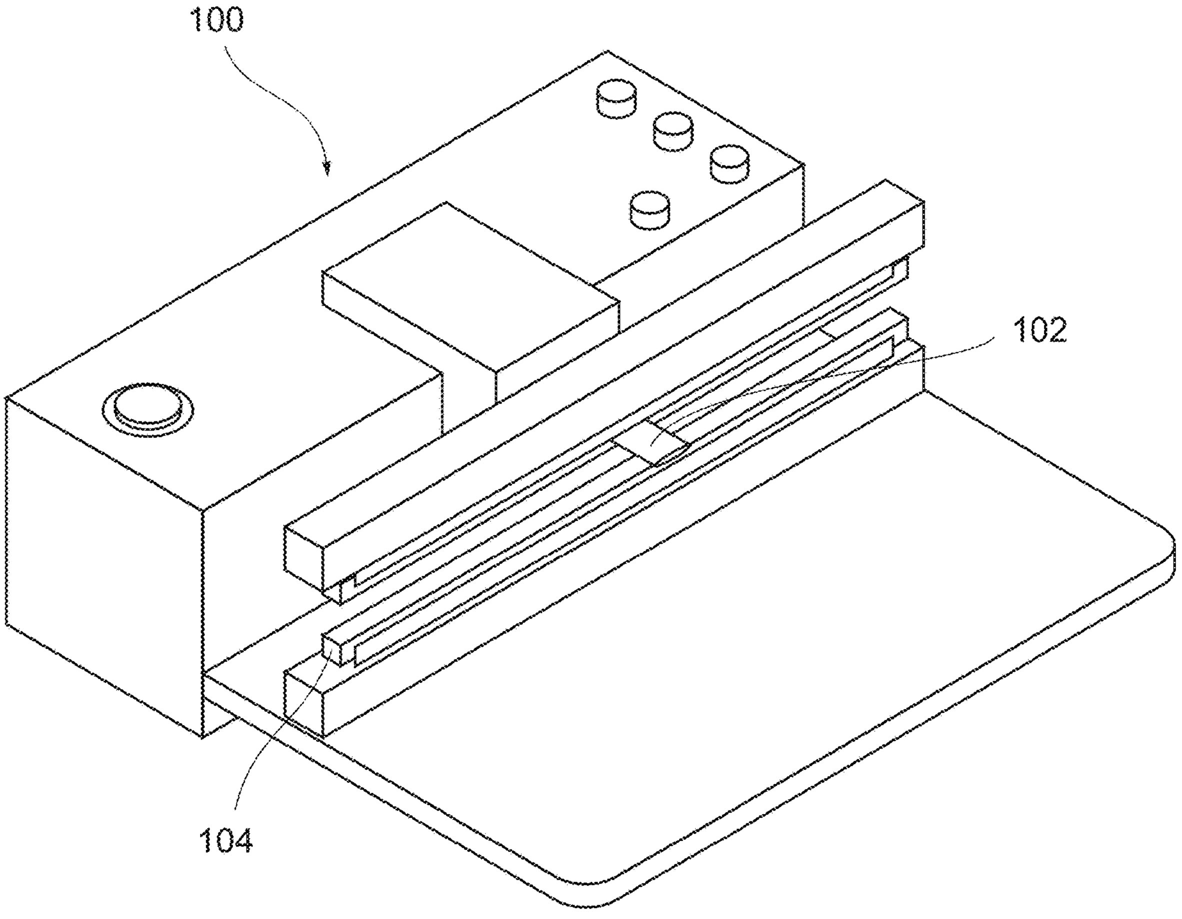
FIG. 8 is a view showing one example of packing equipment.

On the tray (3) in which the vials (4) have been inserted, the soft film (5) is installed in such a manner that the soft film covers the bottom portions of the vials (4) (see FIG. 5), and the tray and the soft film are introduced into the gas-impermeable flexible film bag (2) (see FIG. 7). Thereafter, the gas-impermeable flexible film bag (2) is transported to packing equipment including a heating device capable of sealing the opening (22) and a depressurization device capable of depressurizing the inside (21) of the bag (see FIG. 8, FIG. 9).

Figure 9:
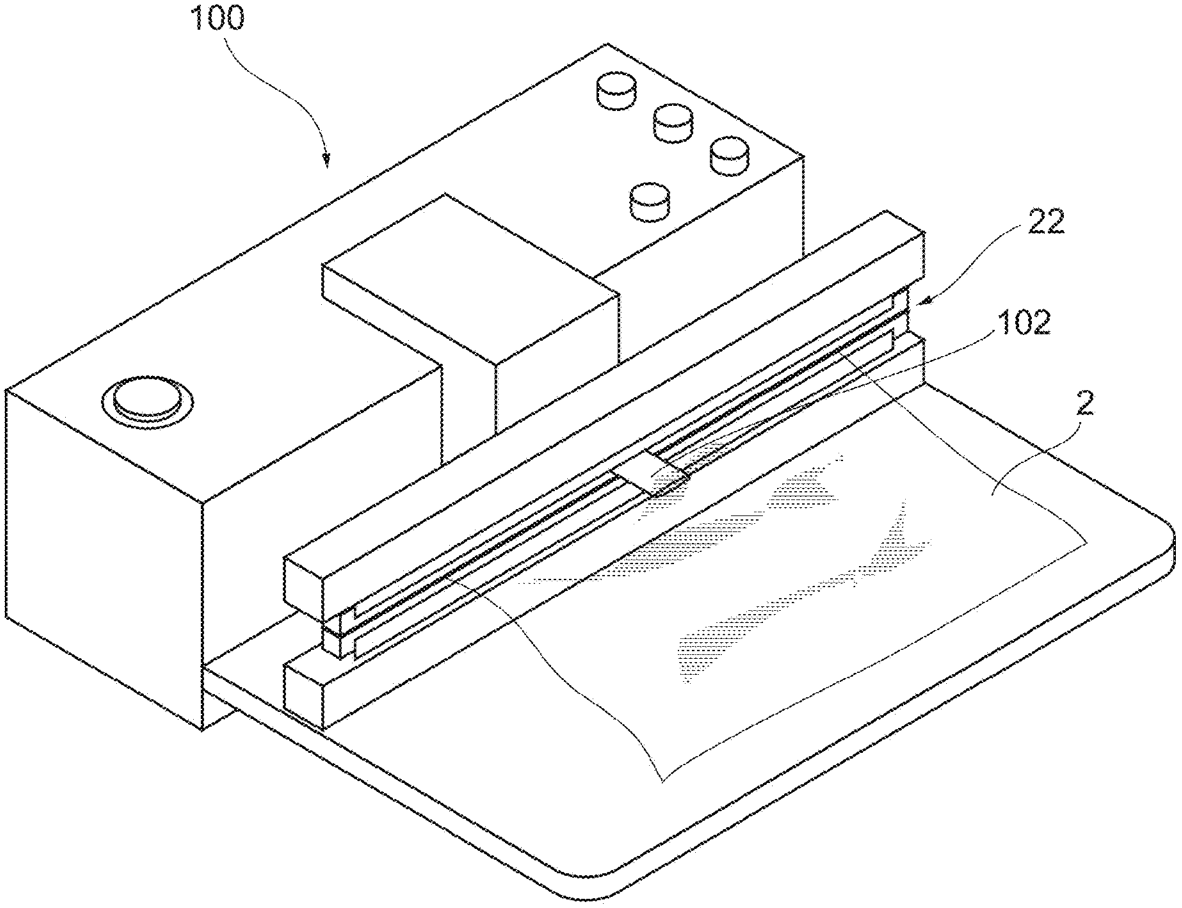
FIG. 9 is a view showing an opening of a flexible film bag, the opening being pressed down by packing equipment.
Figure 10:
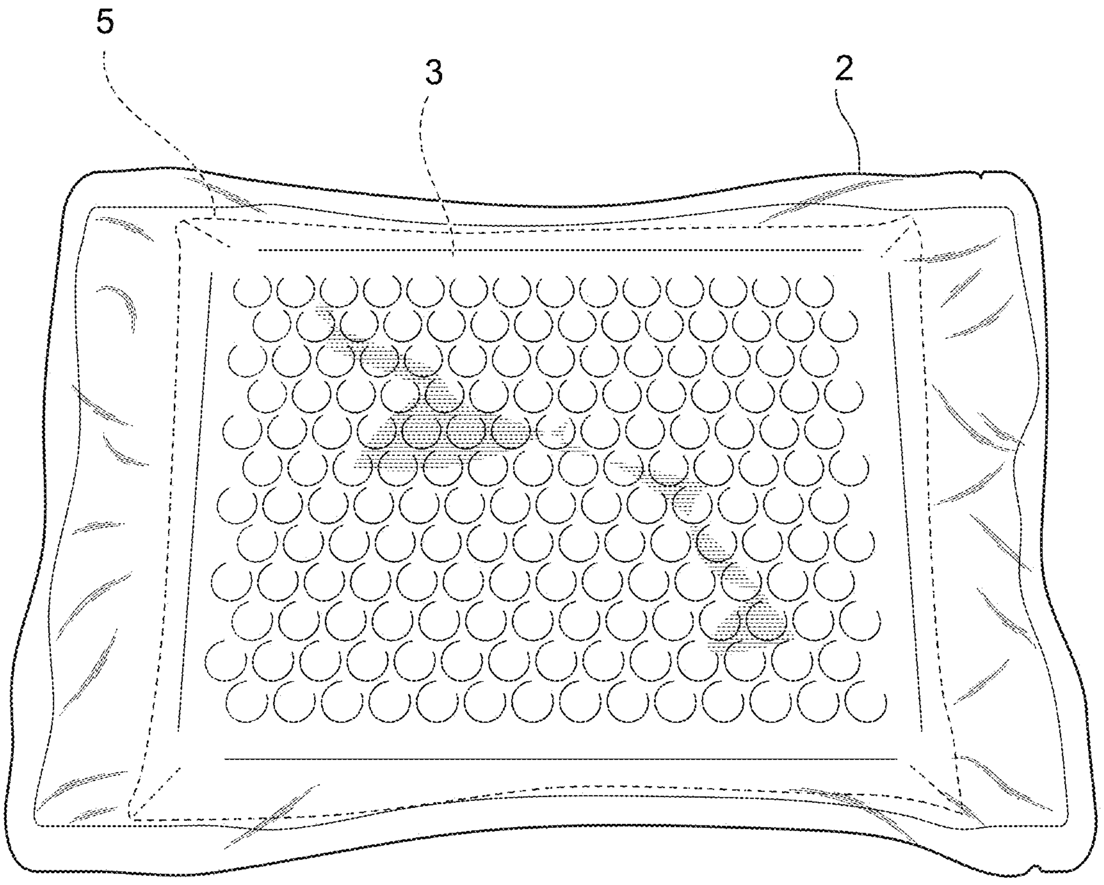
FIG. 10 is a view showing a depressurized flexible film bag into which a tray, vials, and a soft film have been introduced.
Figure 11:
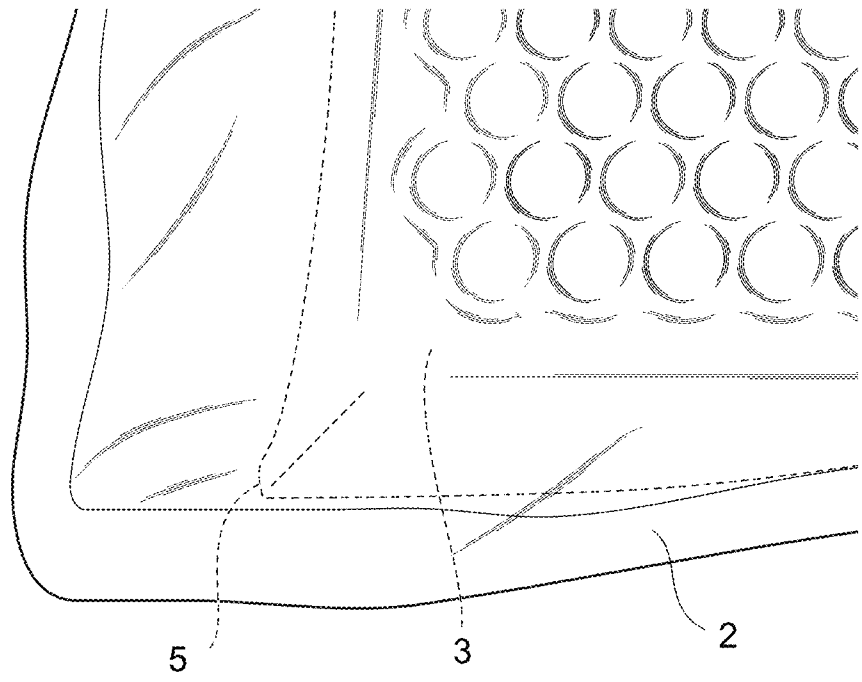
FIG. 11 is an enlarged view showing part of a depressurized flexible film bag, etc., the view illustrating a vial packed body constituted in such a state that a soft film is not in direct contact with vials.

The opening (22) of the gas-impermeable flexible film bag (2) is kept airtight so that air should not enter from the outside after a depressurization nozzle (102) for depressurizing the inside (21) of the bag is introduced into the flexible film bag (2), and the depressurization device is operated to exhaust air from the inside (21) of the bag through the depressurization nozzle (102) (see FIG. 9). As air is exhausted from the inside (21) of the bag, the flexible film bag (2) is depressurized to a prescribed vacuum pressure at which the flexible film bag presses down the tray (3), the vials (4), and the soft film (5) with the outside pressure, and they are unable to move to each other (see FIG. 10). After the flexible film bag is depressurized to the prescribed vacuum pressure, it is preferable to not only stop the depressurization but also pull out the depressurization nozzle (102) from the inside (21) of the bag and rapidly seal the opening (22) with a heating section 104 of the heating device (see FIG. 8, FIG. 9). Rapid sealing of the opening (22) makes it possible to maintain the prescribed vacuum pressure.

After the steps (II to V), the gas-impermeable flexible film bag (2) in which the tray (3), the vials (4), and the soft film (5) have been enclosed is preferably sterilized by radiation. The reason for this is that gas such as ethylene oxide or hydrogen peroxide cannot sterilize the vials (4) present inside the gas-impermeable flexible film bag (2), and moreover, the vials (4) cannot withstand the sterilization temperature because they are formed of a thermoplastic resin. This sterilization step can be omitted if the vial installation step (XI), the step (I) in which the vials (4) are inserted in the tray (3), and the steps (II to V) in which the tray (3), the vials (4), and the soft film (5) are inserted in the flexible film bag (2) and packed are carried out under sterile conditions.

<Step VI>

The vial packed body (1) constituted of the gas-impermeable flexible film bag (2) in which the vials (4) have been inserted is transported to a contents-filling location in order to fill the vials with medicaments, cells, or the like. An example of the contents-filling location is a sterile isolator in which filling with medicaments, cells, or the like can be carried out under sterile conditions. Before the gas-impermeable flexible film bag (2) in which the vials (4) have been inserted is taken in the sterile isolator, alcohol sterilization, hydrogen peroxide sterilization, electron beam sterilization, or the like is preferably carried out in order to remove bacteria or pollutants having adhered to the outside of the gas-impermeable flexible film bag (2). Alternatively, the aforementioned sterilization methods may be combined by, for example, providing a front chamber in the isolator, and carrying out alcohol sterilization before the flexible film bag is taken in the front chamber, or carrying out electron beam sterilization in the front chamber.

Before the gas-impermeable flexible film bag (2) is taken inside the isolator, it is preferable to confirm that the gas-impermeable flexible film bag (2) is maintained at the prescribed vacuum pressure. If the prescribed vacuum pressure is maintained, the inside (21) of the bag is kept under sterile conditions. On the other hand, if the prescribed vacuum pressure is released, the inside (21) of the bag is no longer under sterile conditions. By this confirmation of the maintenance of the vacuum pressure, it becomes possible to avoid a problem that the vials (4) having been no longer under sterile conditions are filled with medicaments or cells.

<Step VII>

After the gas-impermeable flexible film bag (2) is taken in the medicament-filling location, the flexible film bag is tear-opened from a tear notch (23) formed at one end of the bag to release the vacuum state inside the bag. Examples of the tear notch (23) include, but not limited to, a cutout formed at one end of the flexible film bag (2) and a stress concentration zone where many fine holes are provided. By providing the tear notch (23), there is no need to install, inside the isolator, cutlery for bag opening, such as scissors or a cutter, which may cause contamination or the like.

<Step VIII>

The tray (3) in which the vials (4) have been inserted is taken out from the inside (21) of the bag. In the present embodiment, the tray (3) is taken out from the inside (21) of the bag in such a state that the bottom (31) of the tray (3) is present on the lower side, that is, in the state when the vials (4) are inserted in the tray (3) with the opening portions (41) of the vials facing down. In this case, the soft film (5) is not taken out from the inside (21) of the bag. After the tray (3) in which the vials (4) have been inserted is taken out, the gas-impermeable flexible film bag (2) and the soft film (5) become unnecessary waste, and by leaving the soft film (5) in the inside (21) of the bag, the bulk of the waste is suppressed, and the inside of the isolator can be efficiently used.

When the opening (22) is sealed in the step (V), the soft film (5) is preferably fixed by the seal section. By fixing the soft film (5) by the seal section, it becomes possible to prevent a problem that the soft film (5) is taken out together with the tray (3) in which the vials (4) have been inserted.

<Steps IX to X>

Figure 14A:
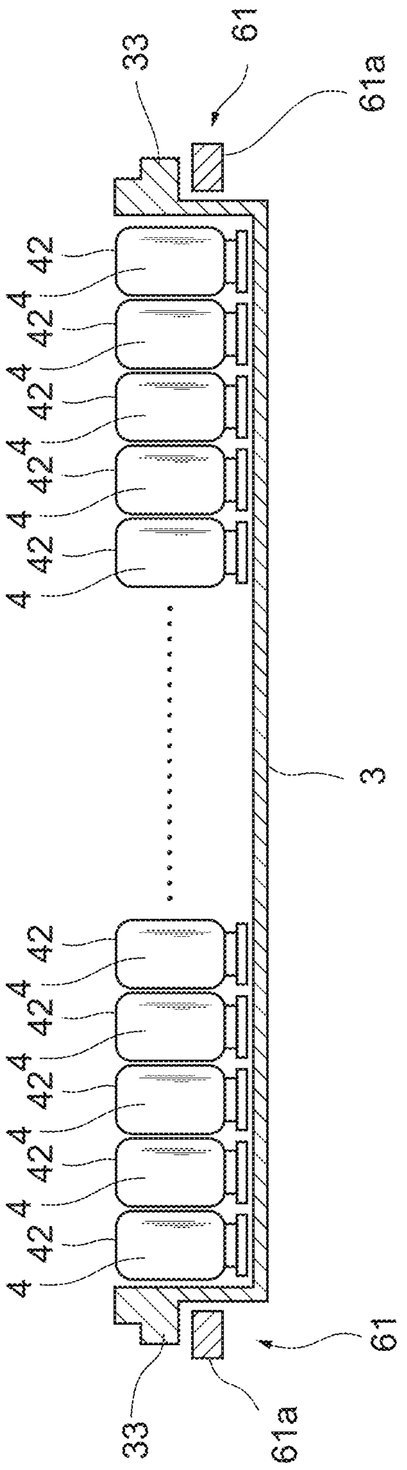
FIG. 14A is a schematic view illustrating one example of a tool for supporting part of a tray, such as peripheral portion, from below.
Figure 14B:
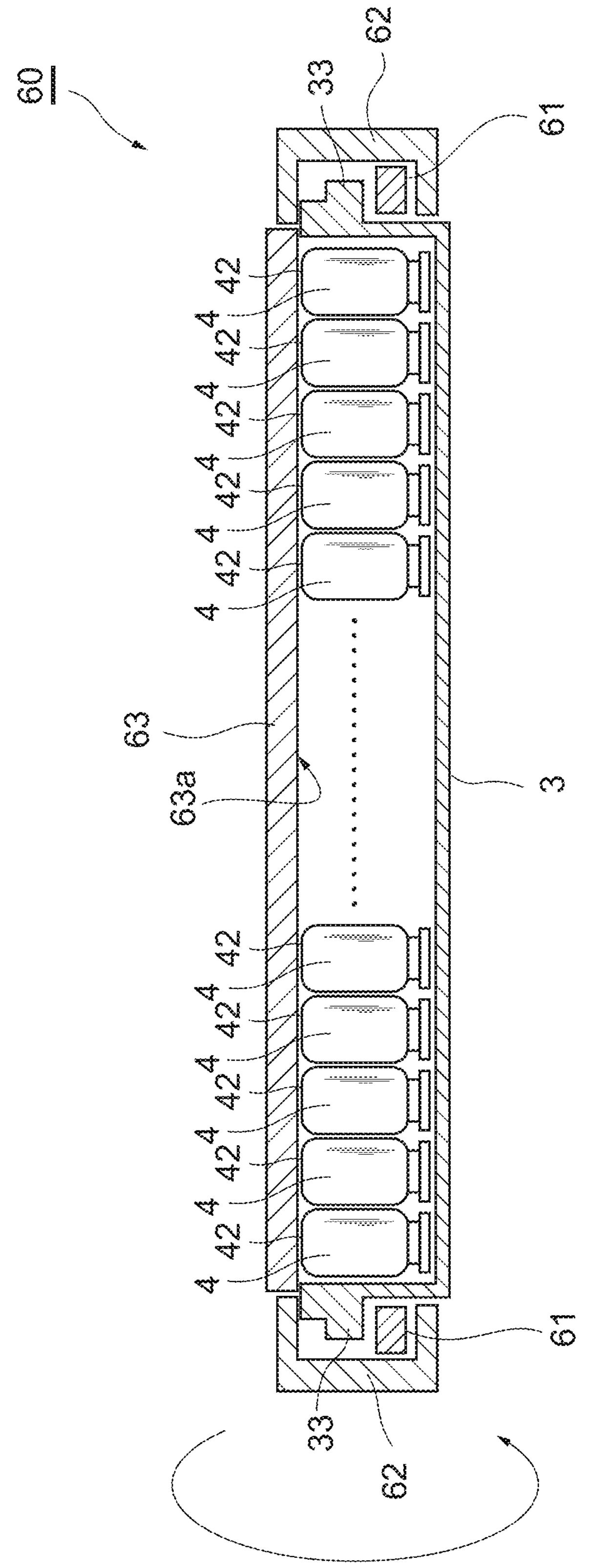
FIG. 14B is a schematic view illustrating one example of a tray inversion device.
Figure 14C:
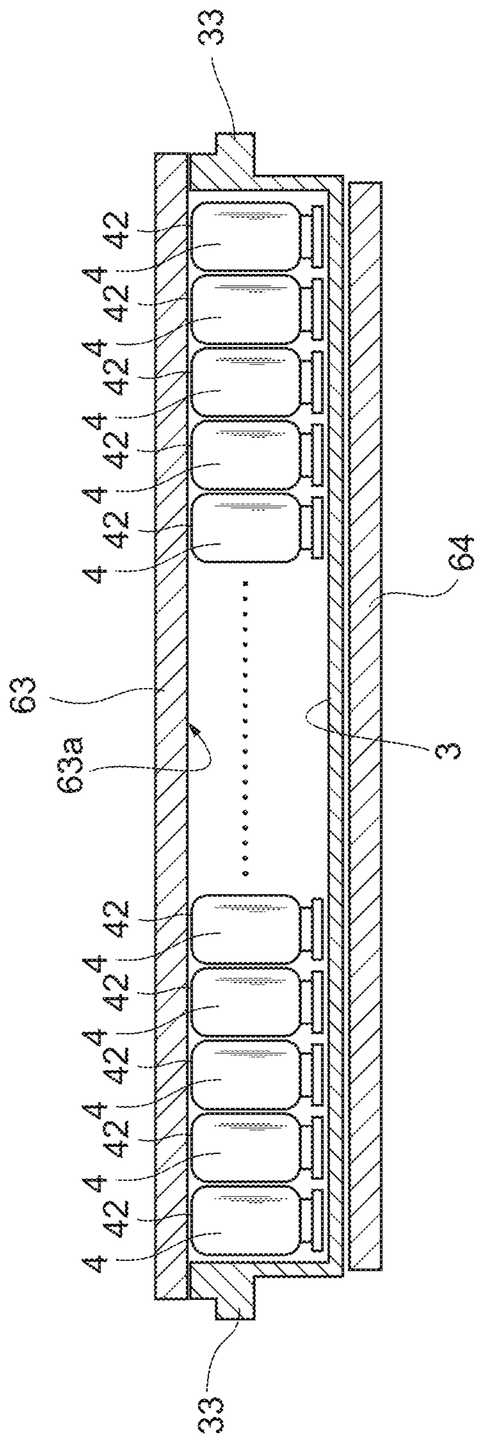
FIG. 14C is a schematic view illustrating one example of a tray inversion device constituted of a plate-like member, etc.
Figure 15:
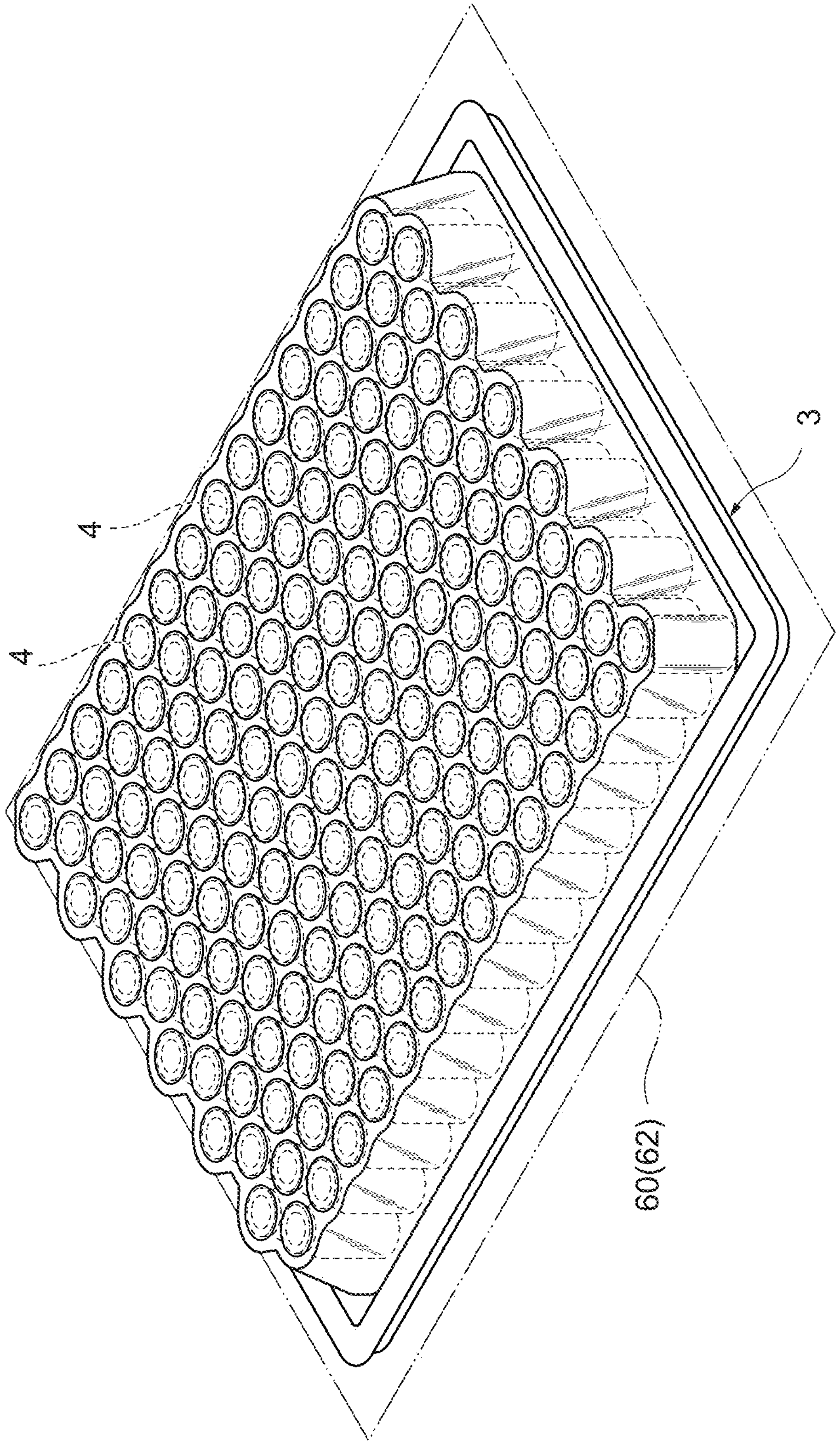
FIG. 15 is a view showing a tray, etc. which have been taken out from a flexible film bag and inverted.
Figure 16:
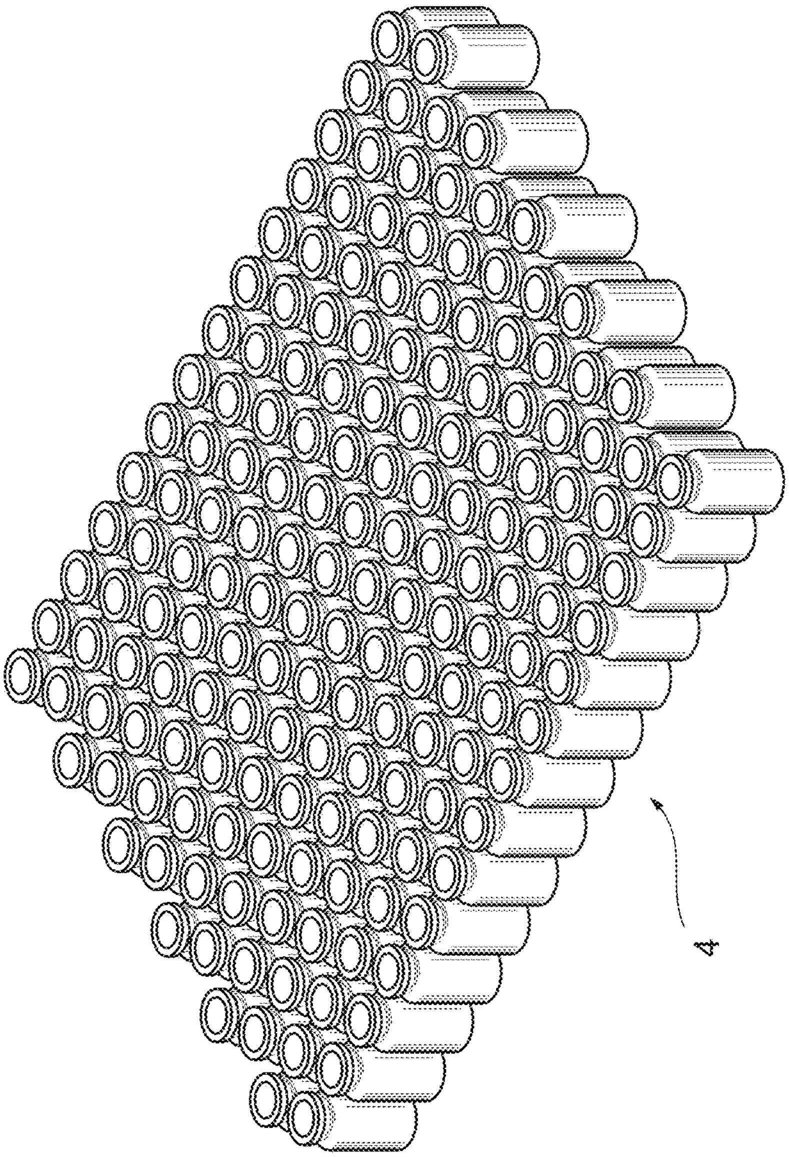
FIG. 16 is a view showing vials from which a tray has been removed.

The tray (3) in which the vials (4) have been inserted is transported to a device (60) including a tool (61) for supporting part of the tray (3), such as the peripheral portion (33), from below, a tool (62) for fixing the tray (3), and a tool (63) having a supporting surface (63*a*) for supporting the bottom portions (42) of the vials (4), and thereafter, the tray (3) is fixed, and inverted while the bottom portions (42) of the vials (4) are supported (see FIG. 14A, FIG. 15). An example of such a device 60 includes a tool (61) having such a frame-like section (61*a*) as holds the peripheral wall portion (32) of the tray (3) and supports the tray from the lower part of the peripheral portion (33), a tool (62) that pinches the peripheral portion (33) and the frame-like section (61*a*) and fixes them from, for example, the side, and a tool (63) having a supporting surface (63*a*) for supporting the bottom portions (42) of the vials (4) (see FIG. 14B). The tool (61) for supporting the tray (3) from below may be a plate-like member that supports the bottom (31) of the tray (3), and if the tool (61) can support the tray (3) in which the vials (4) have been inserted, with sufficient force during the inversion, the tool (62) for fixing the tray is not necessarily required (see FIG. 14C). The device (60) can be constituted of manual or electric rotating equipment for inverting these tools so that the top and bottom become upside down. Instead of using such a device, the workers may operate the plate-like member 64, etc. to carry out inversion work while supporting the bottom portions (42) of the vials (4) (see FIG. 14C, FIG. 15). The tray (3) is vertically removed in such a state that the bottom portions (42) of the vials (4) are put on the supporting surface (see FIG. 16), and the vials (4) are placed or allowed to stand on the supporting surface (e.g., upper surface of a workbench) with the opening portions (41) of the vials (4) facing up, and transported to a filling line manually or by transportation equipment.

Figure 12:
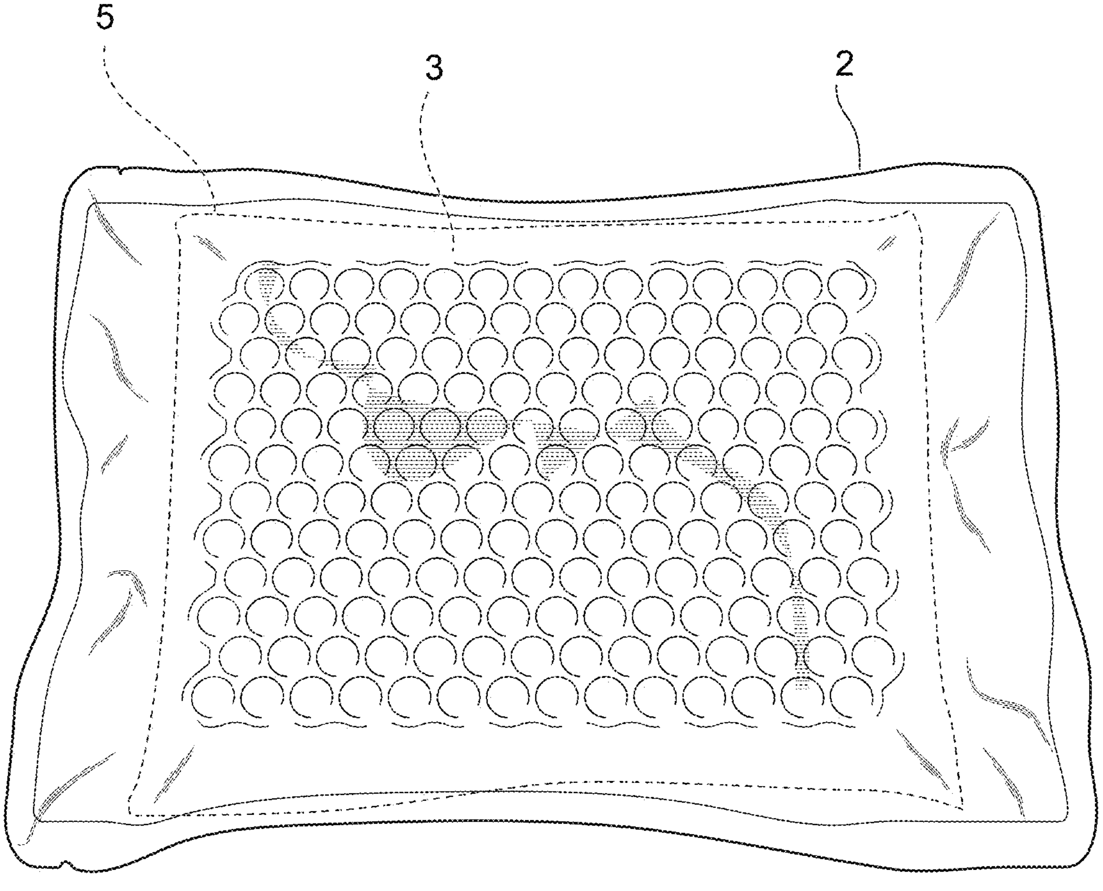
FIG. 12 is a view showing a depressurized flexible film bag, etc. which have been inverted (state where the tray is on the upper side of vials), for reference.
Figure 13:
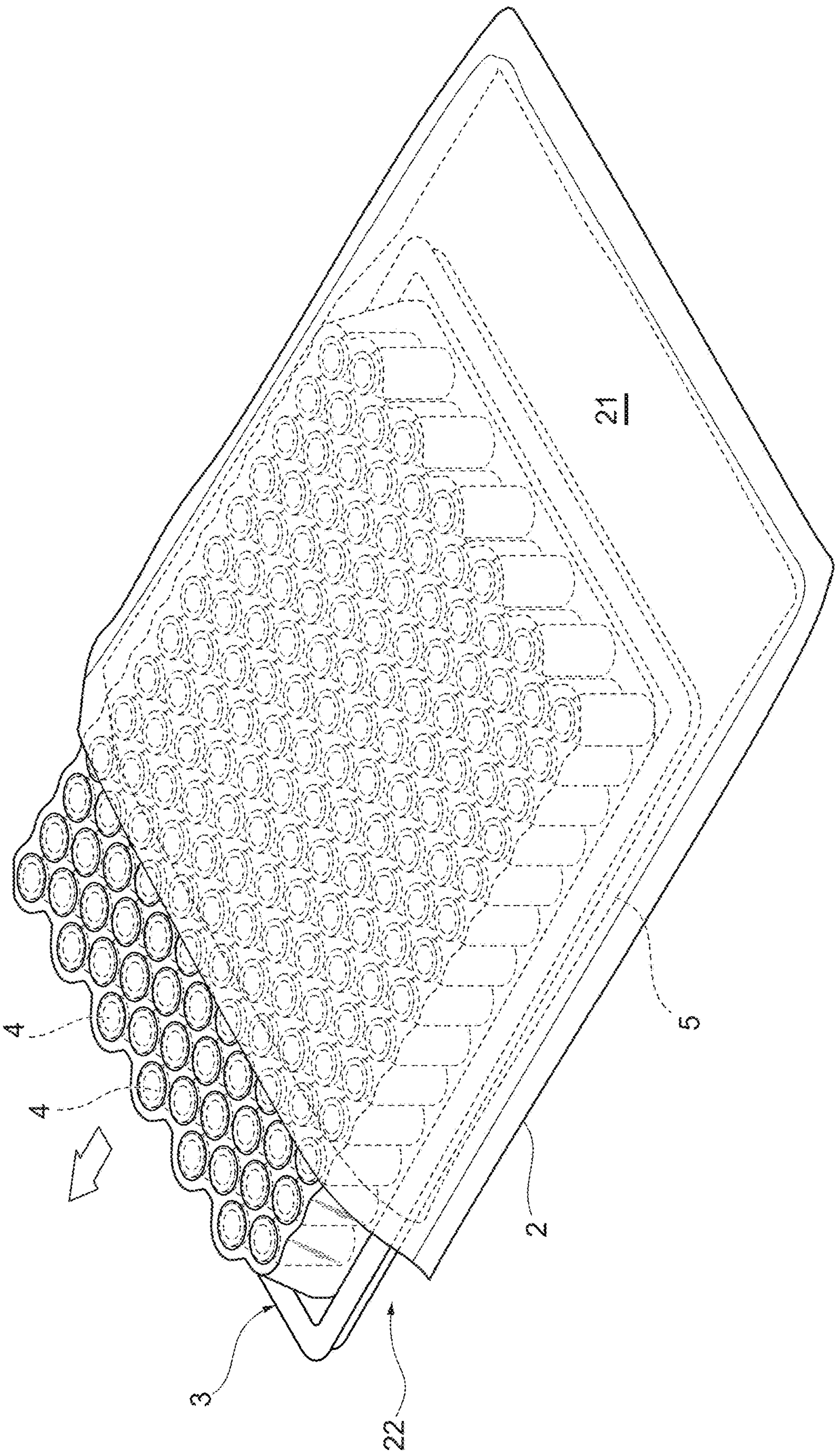
FIG. 13 is a view showing how a tray and vials are taken out from an opened flexible film bag in a previously inverted state (state where the tray is on the upper side of vials), for reference.

The above-mentioned embodiment is one preferred embodiment of the present invention, but the present invention is not limited to this, and various modifications can be made without departing from the scope of the present invention. For example, in the above-mentioned embodiment, steps of taking out the tray (3) from the inside (21) of the bag in such a state that the bottom (31) of the tray (3) is present on the lower side and thereafter inverting the tray (3) and the vials (4) using the device 60 are described, but this is just a preferred example. That is to say, a problem of the conventional vial transportation method in which "a rigid sheet, vials, and a tray are placed on a supporting surface in such a manner that bottom sides of the vials are put on the rigid sheet, and the rigid sheet is removed from the bottom sides of the vials so that the bottom sides thereof are put on the supporting surface", is that the vials are pulled by the rigid sheet to cause tipping or dropping of the vials, and from the viewpoint of prevention of this, the aforementioned steps can be said to be one preferred example, but alternatively, it is also possible to take out the tray (3) from the inside (21) of the bag in such a state that the bottom (31) of the tray (3) is present on the upper side as long as the vials (4) can be taken out together with the tray (3) from the inside (21) of the bag smoothly without sliding resistance along an extremely smooth surface of the soft film 5 under the condition that the risk of tipping of the vials is extremely low (see FIG. 12, FIG. 13).

INDUSTRIAL APPLICABILITY

The present invention is preferably applied in each situation of, for example, packing vials used for storage of medicaments or cells, etc. and installing the vials or allowing the vials to stand, or producing a vial packed body.

REFERENCE SIGNS LIST

1 Vial packed body
2 Flexible film bag
21 Inside of flexible film bag
22 Opening of flexible film bag
23 Tear notch
3 Tray
31 Bottom of tray
31*a* Depression
31*b* Groove-like portion
32 Peripheral wall portion
32*a* Arc shape
32*b* Convex portion
33 Peripheral portion of tray
4 Vial
41 Opening portion of vial
42 Bottom portion of vial
5 Soft film
60 Inversion device
61 Tool for supporting part of tray (e.g., peripheral portion 33) from below
61*a* Frame-like section
62 Tool for fixing tray
63 Tool having supporting surface for supporting bottom portion of vial
63*a* Supporting surface
64 Plate-like member
100 Packing equipment
102 Depressurization nozzle
104 Heating section

The invention claimed is:

1. A method for packing vials by vacuum-packing vials for filling with contents such as medicaments or cells, the method comprising:

(I) inserting a plurality of the vials in a tray with opening portion sides of the vials facing a bottom of the tray, (II) installing a soft film on bottom portions of the vials, (III) introducing the tray having the vials installed therein and the soft film installed on the bottom portions of the vials, into a gas-impermeable flexible film bag, (IV) depressurizing the inside of the flexible film bag to a prescribed vacuum pressure so that the flexible film bag surrounds at least the soft film and the tray and fixes them, and (V) sealing the opening of the flexible film bag so that the depressurized inside of the flexible film bag can be maintained at the prescribed vacuum pressure, wherein during the sealing of the opening, the opening is sealed together with part of the soft film.

2. The method for packing vials according to claim 1, further comprising:

(VI) forming and inspecting vials before part (I), and (VII) carrying out sterilization by radiation after part (V).

3. The method for packing vials according to claim 1, wherein the prescribed vacuum pressure in part (IV) is in the range of 20 to 40 kPa.

4. The method for packing vials according to claim 1, wherein the soft film described in part (III) has a shape to cover all of peripheral portions of the tray.

5. A method for installing vials by transporting a packed body of vials packed by the method according to claim 1 and installing the vials after opening of the packed body, the method for installing vials comprising:

(VIII) transporting the soft film, the tray, and the vials having been vacuum-packed with the flexible film bag by depressurizing and sealing the flexible film bag, to a contents-filling location, (IX) tearing the flexible film bag, at the contents-filling location, by using a tear notch formed at one end of the bag as a starting point to release the vacuum state of the inside of the flexible film bag, (X) taking out the tray and the vials from the flexible film bag, (XI) inverting the vials and the tray with an inversion device comprising a tool for fixing the tray and a tool having a supporting surface for supporting the bottom portions of the vials, (XII) removing the tray from the vials vertically, and (XIII) installing the vials at prescribed positions.

6. A method for producing a vial packed body by vacuum-packing vials for filling with contents such as medicaments or cells to make the vials suitable for transport to a prescribed filling location, the method comprising:

inserting a plurality of the vials in a tray with opening portion sides of the vials facing a bottom of the tray, installing a soft film on the bottom portions of the vials, introducing the tray having the vials installed therein and the soft film installed on the bottom portions of the vials, into a gas-impermeable flexible film bag, depressurizing the inside of the flexible film bag to a prescribed vacuum pressure so that the flexible film bag surrounds at least the soft film and the tray and fixes them, and sealing the opening of the flexible film bag so that the depressurized inside of the flexible film bag is maintained at the prescribed vacuum pressure, wherein during the sealing of the opening, the opening is sealed together with part of the soft film.

* * * * *